United States Patent
Lin (10) Patent No.: US 8,564,993 B2
(45) Date of Patent: Oct. 22, 2013

(54) SWITCH CONTROL CIRCUIT, SWITCH CONTROL METHOD, POWER CONVERTER, AND POWER CONVERSION METHOD FOR CONTROLLING CONDUCTING STATUSES OF SWITCH ELEMENTS IN BRIDGELESS SWITCHING CIRCUIT

(75) Inventor: Kuo-Fan Lin, Taoyuan County (TW)

(73) Assignee: FSP Technology Inc., Taoyuan, Taoyuan County (TW)

( * ) Notice: Subject to any disclaimer, the term of this patent is extended or adjusted under 35 U.S.C. 154(b) by 182 days.

(21) Appl. No.: 13/198,710

(22) Filed: Aug. 4, 2011

(65) Prior Publication Data
US 2012/0243275 A1 Sep. 27, 2012

(30) Foreign Application Priority Data
Mar. 22, 2011 (TW) .............................. 100109686 A (51) Int. Cl.
*H02M 5/42* (2006.01)
*H02M 7/217* (2006.01)
(52) U.S. Cl.
USPC ............................................ 363/89; 363/127

(58) Field of Classification Search
USPC .......................... 363/79, 80, 84, 89, 125, 127
See application file for complete search history.

(56) References Cited

U.S. PATENT DOCUMENTS

| | | | |
|---|---|---|---|
| 8,199,541 B2 * | 6/2012 | Yang | 363/89 |
| 2011/0013436 A1 * | 1/2011 | Gan et al. | 363/126 |
| 2011/0075462 A1 * | 3/2011 | Wildash | 363/127 |
| 2012/0051107 A1 * | 3/2012 | Choi | 363/126 |

* cited by examiner

*Primary Examiner* — Adolf Berhane
(74) *Attorney, Agent, or Firm* — Winston Hsu; Scott Margo (57) ABSTRACT

A switch control circuit for controlling a first switch element and a second switch element within a bridgeless switching circuit is provided. The bridgeless switching circuit generates an output signal according to an alternating current signal. The switch control circuit includes a current generating element and a phase generating element. The current generating element is for sensing a first current flowing through the first switch element and a second current flowing through the second switch element, and generating a phase comparison result according to the first and the second currents. The phase generating element generates a first control signal and a second control signal according to a power factor correction signal and the phase comparison result to control conducting status of the first and the second switch elements, respectively.

22 Claims, 9 Drawing Sheets

SWITCH CONTROL CIRCUIT, SWITCH CONTROL METHOD, POWER CONVERTER, AND POWER CONVERSION METHOD FOR CONTROLLING CONDUCTING STATUSES OF SWITCH ELEMENTS IN BRIDGELESS SWITCHING CIRCUIT

BACKGROUND OF THE INVENTION

1. Field of the Invention

The disclosed embodiments of the present invention relate to switch control circuits of a bridgeless switching circuit and a power converter and related method thereof, and more particularly, to a control circuit for controlling a conducting status of a first switch element and a second switch element within a bridgeless switching circuit and related method thereof.

2. Description of the Prior Art

Figure 1:
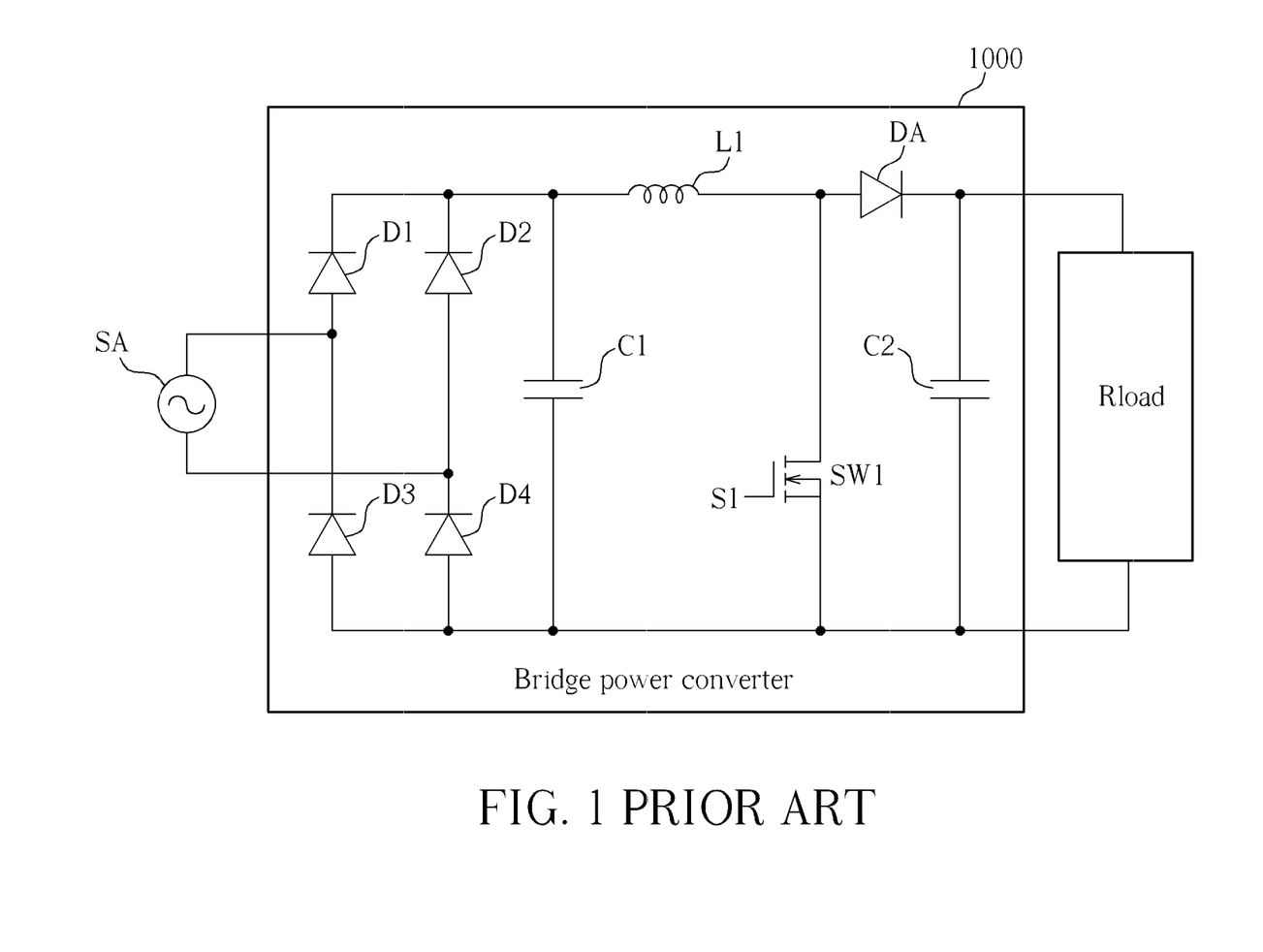
FIG. 1 is a diagram illustrating a conventional bridge power converter employed to convert an alternating current of an AC power to generate a direct current to a load.

To enhance the power conversion efficiency, the number of switches and the voltage drop loss of the switches are deceased as much as possible in the conventional alternating current-direct current power converter (AC-DC power converter). For example, by employing a bridgeless switching circuit which collaborates with a related power factor correction circuit, it may decrease the number and the voltage drop of the switches in the conduction path and thereby enhance the power conversion efficiency. Please refer to FIG. 1, which is a diagram illustrating a conventional bridge power converter 1000 employed to convert an alternating current of an AC power SA to generate a direct current to a load Rload. The bridge power converter 1000 includes a plurality of diodes D1-D4, a plurality of capacitors C1 and C2, an inductor L1, and a switch element SW1 (implemented by a metal-oxide-semiconductor field effect transistor (MOSFET)) and a diode DA both used for rectification. As a person skilled in the art can readily understand operations and details of the circuit shown in FIG. 1, further description is omitted here for brevity. However, in the conversion process of the bridge power converter 1000 shown in FIG. 1, the switch element SW1 may perform rectification on the AC power SA according to an input signal S1, and a current conduction path within the bridge power converter 1000 may pass through three diodes (i.e., diodes D1, DA, and D4 in order, or diodes D2, DA, and D4 in order). That is, the converted voltage has to overcome three voltage drops of the three diodes to charge the load Rload successfully.

Figure 2:
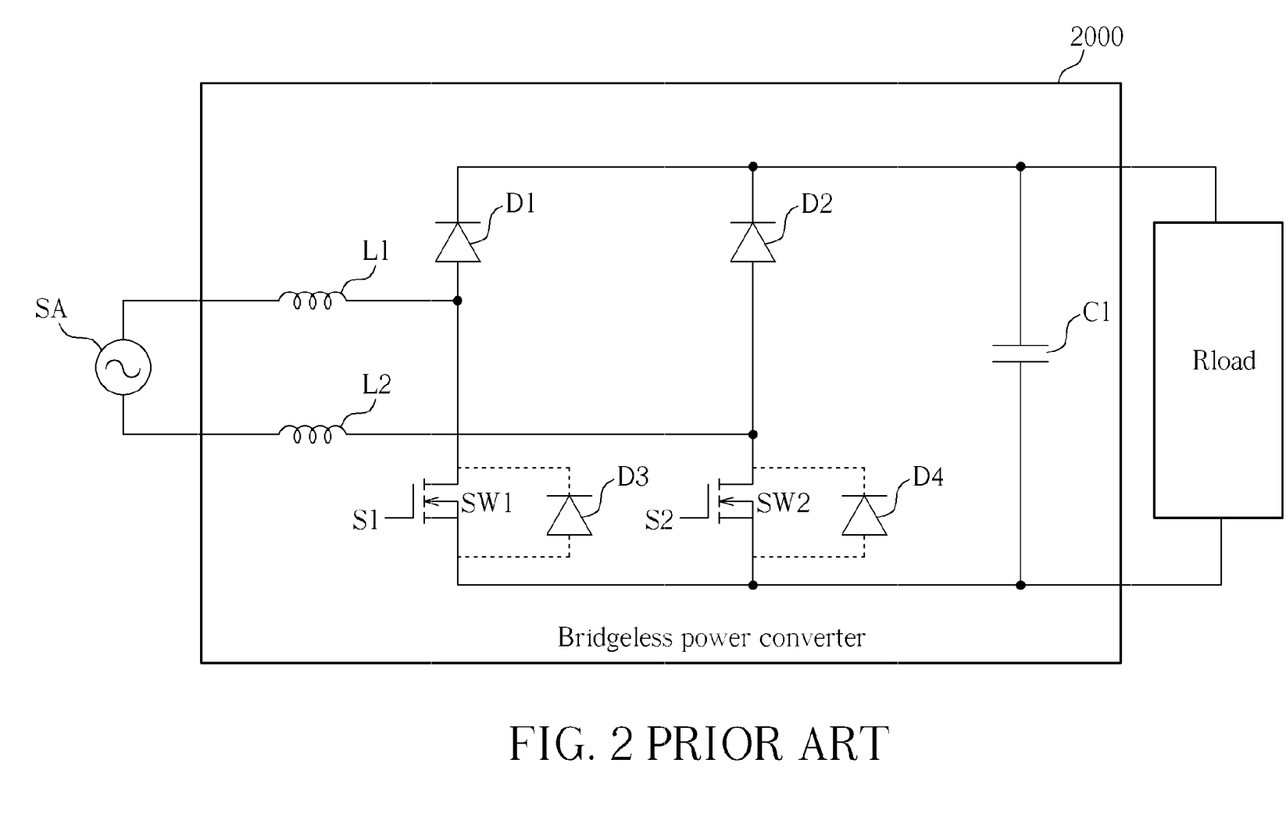
FIG. 2 is a diagram illustrating a conventional bridgeless power converter employed to convert an alternating current of an AC power to generate a direct current to a load.

Please refer to FIG. 2, which is a diagram illustrating a conventional bridgeless power converter 2000 employed to convert an alternating current of an AC power SA to generate a direct current to a load Rload. The bridgeless power converter 2000 includes a plurality of inductors L1 and L2, a plurality of diodes D1 and D2, a plurality of switch elements SW1 and SW2 each implemented by a metal-oxide-semiconductor field effect transistor (MOSFET), and a capacitor C1, wherein when the switch elements SW1 and SW2 are not switched on, they may bear the characteristics of body diodes (i.e., diodes D3 and D4 shown in FIG. 2), respectively. In other words, switch elements SW1 and SW2 may respectively bear characteristics of switches and characteristics of diodes D3 and D4 used for half rectification according to phases of the inputs S1 and S2. Compared to the bridge power converter 1000, the bridgeless power converter 2000 has a conduction path having only two voltage drops of switch elements (e.g., voltage drops of the diode D1 and the body diode D4 in the switch element SW2, or voltage drops of the diode D2 and the body diode D3 in the switch element SW1). Therefore, the bridgeless power converter 2000 may further enhance the power conversion efficiency.

However, as for the conventional bridgeless power converter 2000, the input signals received by the switch elements SW1 and SW2 may have the same waveform. That is, both of the switch elements SW1 and SW2 are either switched on or switched off at the same time due to the input signals S1 and S2 with the same waveform. In addition, the frequent switching of the switch elements SW1 and SW2 may result in unnecessary power loss. Thus, how to improve the switch control method of the bridgeless switching circuit and enhance the power conversion efficiency is a serious issue in the pertinent field.

SUMMARY OF THE INVENTION

One of the objectives of the present invention is to enhance the power conversion efficiency based on architecture of a bridgeless power converter.

According to an embodiment of the present invention, an exemplary switch control circuit for controlling conducting statuses of a first switch element and a second switch element within a bridgeless switching circuit is provided. The bridgeless switching circuit generates an output signal according to an alternating current signal. The exemplary switch control circuit includes a current generating element and a phase generating element. The current generating element senses a first current flowing through the first switch element and a second current flowing through the second switch element, and generates a phase comparison result according to the first and the second currents. The phase generating element generates a first control signal and a second control signal according to a power factor correction signal and the phase comparison result to control conducting status of the first switch element and the second switch element, respectively.

According to an embodiment of the present invention, an exemplary switch control method for controlling conducting statuses of a first switch element and a second switch element within a bridgeless switching circuit is provided. The bridgeless switching circuit generates an output signal according to an alternating current signal. The exemplary switch control method includes sensing a first current flowing through the first switch element and a second current flowing through the second switch element in the bridgeless switching circuit, and generating a phase comparison result according to the first and the second currents; and generating a first control signal and a second control signal according to a power factor correction signal and the phase comparison result to control conducting status of the first switch element and the second switch element, respectively.

According to an embodiment of the present invention, an exemplary power converter is provided. The exemplary power converter includes a bridgeless switching circuit and a switch control circuit. The bridgeless switching circuit generates an output signal according to an alternating current signal, and has a first switch element and a second switch element. The switch control circuit generates a first control signal and a second control signal to control conducting status of the first switch element and the second switch element, wherein the first control signal and the second control signal do not make both of the first switch element and the second switch element switched off simultaneously.

According to an embodiment of the present invention, an exemplary power conversion method is provided. The exemplary power conversion method includes: utilizing a bridgeless switching circuit to generate an output signal according to an alternating current signal, wherein the bridgeless switching circuit has a first switch element and a second switch element; and generating a first control signal and a second control signal to control conducting status of the first switch element and the second switch element, respectively, wherein the first control signal and the second control signal do not make both of the first switch element and the second switch element switched off simultaneously.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
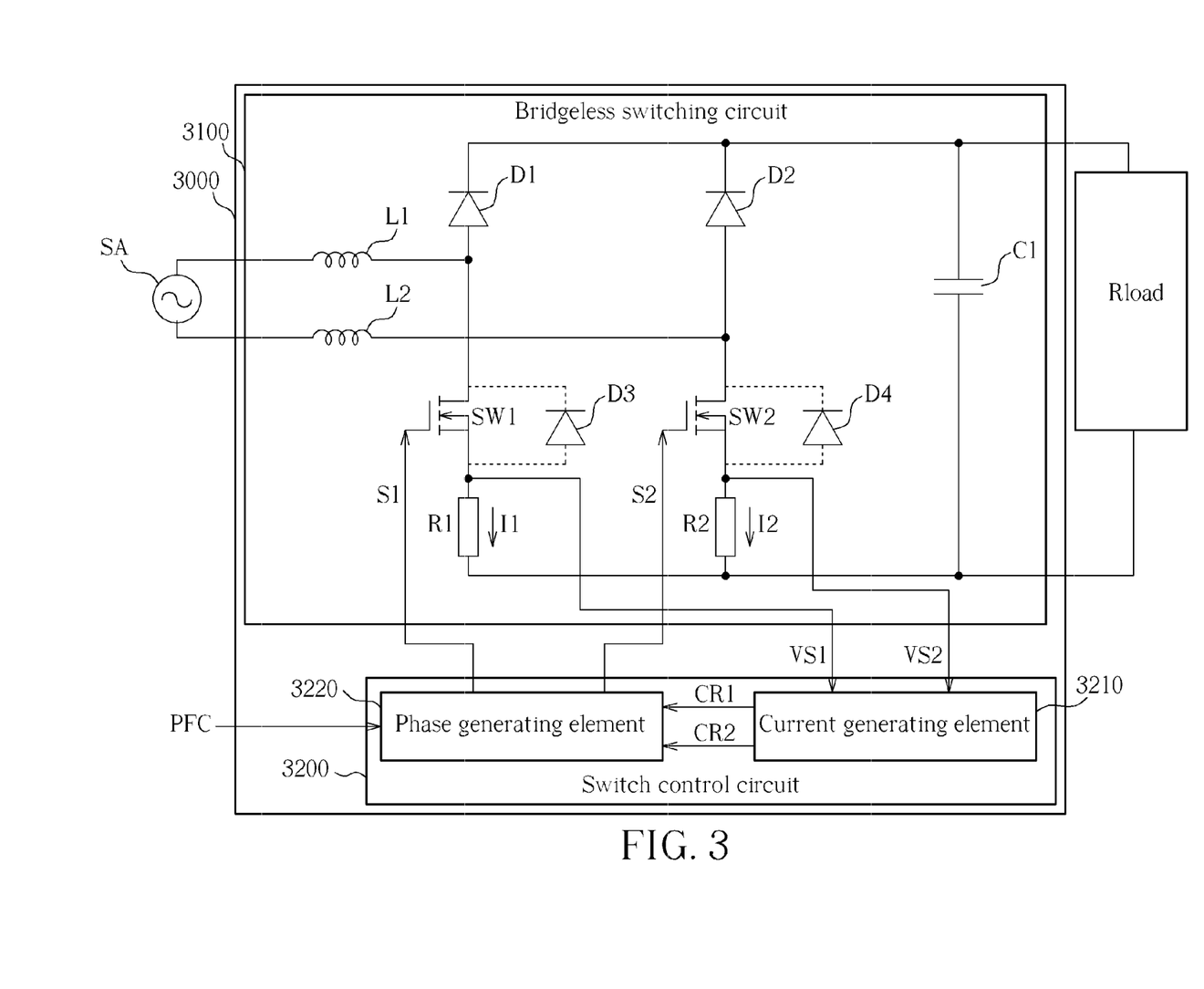
FIG. 3 is a diagram illustrating a power converter employed to convert an alternating current of an AC power to generate a direct current to a load according to an embodiment of the present invention.

Please refer to FIG. 3, which is a diagram illustrating a power converter 3000 employed to convert an alternating current of an AC power SA to generate a direct current to a load Rload according to an embodiment of the present invention. The exemplary power converter 3000 includes a bridgeless switching circuit 3100 and a switch control circuit 3200. The bridgeless switching circuit 3100 generates an output signal according to an alternating current (AC) signal, and has a first switch element SW1 and a second switch element SW2. Besides, as the most part of the bridgeless switching circuit 3100 is substantially the same as the bridgeless switching circuit 2000 shown in FIG. 2, further description is omitted here for brevity. The switch control circuit 3200 includes a current generating element 3210 and a phase generating element 3220.

The current generating element 3210 senses a first current I1 flowing through the first switch element SW1 and a second current I2 flowing through the second switch element SW2, and generates a phase comparison result according to the first current I1 and the second current I2. In this embodiment, the first current I1 and the second current I2 may flow through the corresponding resistors R1 and R2, such that voltages VS1 and VS2 respectively proportional to the first current I1 and the second current I2 are generated. The current generating element 3210 then receives the voltages VS1 and VS2 to generate the phase comparison result including a first comparison result CR1 and a second comparison result CR2. The phase generating element 3220 generates a first control signal S1 and a second control signal S2 according to a power factor correction signal PFC that is provided by an external circuit (not shown) and the phase comparison result (i.e., the first comparison result CR1 and the second comparison result CR2) to control respective conducting statuses of the first switch element SW1 and the second switch element SW2.

Please note that, in this embodiment, the first control signal S1 and the second control signal S2 generated by the phase generating element 3220 do not make both of the first switch element SW1 and the second switch element SW2 switched off simultaneously. In other words, the first control signal S1 and the second control signal S2 would switch on both of the first switch element SW1 and the second switch element SW2 simultaneously, or switch on at least one of the first switch element SW1 and the second switch element SW2. In a case where the power converter 3000 is fully loaded, the difference between the power loss resulted from the voltage drop of the first switch element SW1 (or the second switch element SW2) that is switched on and the power loss resulted from the voltage drop of the body diode of the first switch element SW1 (or the second switch element SW2) that is switched off is small. However, as compared to the conventional bridgeless switching circuit 2000, the bridgeless switching circuit 3100 operating in a half-loaded status or a fully-loaded status may only see the voltage drop between the source-drain of the first switch element SW1 or the second switch element SW2 in the conduction path without encountering the body diode D3/D4 in the first switch element SW1/second switch element SW2. Under an operation condition with smaller current, such as a half-loaded status or a lightly-loaded status, the power loss resulted from the voltage drop between the source-drain of the first switch element SW1 or the second switch element SW2 is less than that of the body diode D3/D4 in operation. In addition, the power loss resulted from switching of the first switch element SW1/second switch element SW2 would be reduced when the number of switching times is reduced. Therefore, the converted voltage finally delivered to the load Rload from the power converter 3000 is higher than that generated from the conventional bridgeless switching circuit 2000 shown in FIG. 2. Thus, the power conversion efficiency can be enhanced effectively.

Figure 4:
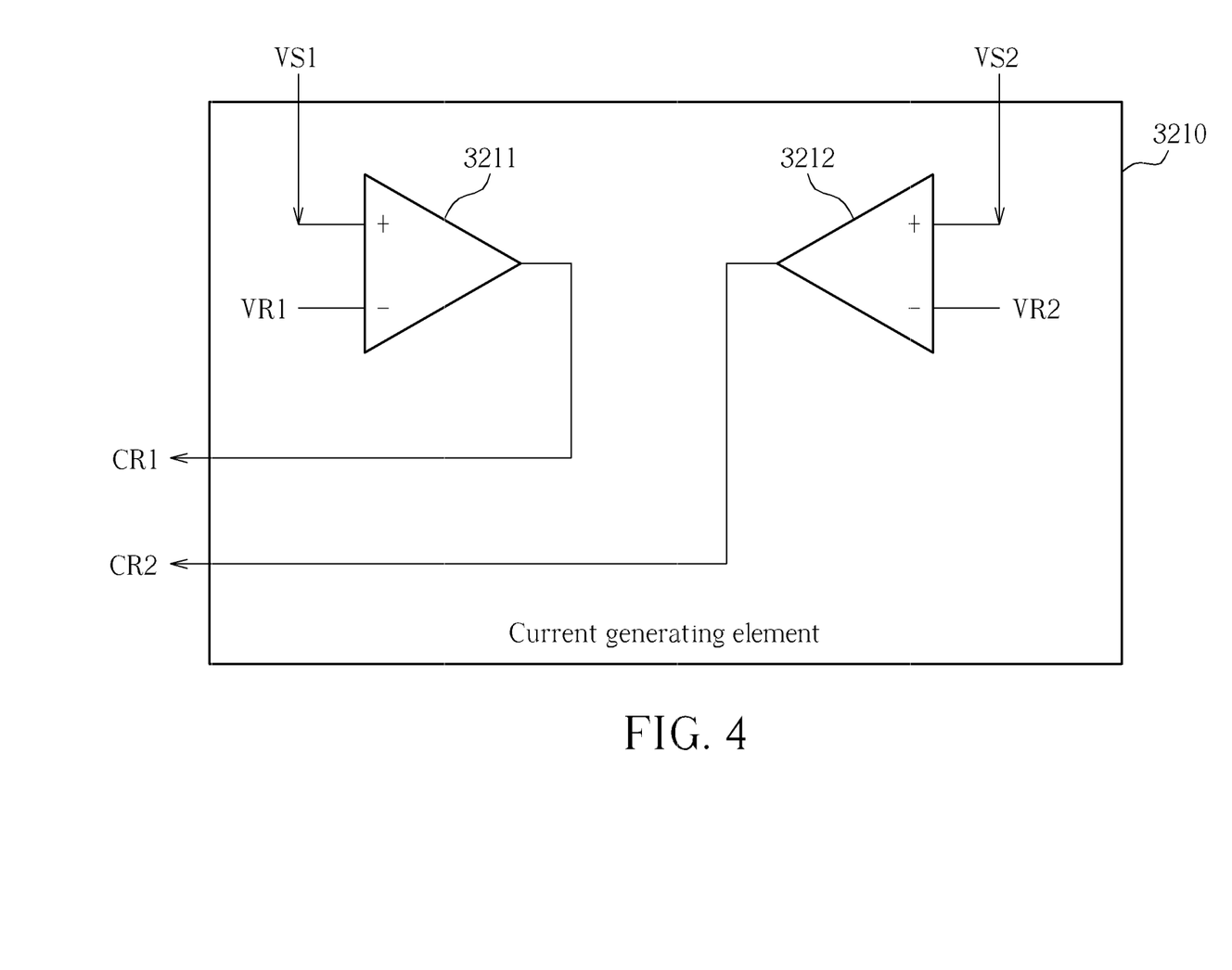
FIG. 4 is a diagram illustrating an exemplary circuit structure of a current generating element according to an embodiment of the present invention.
Figure 5:
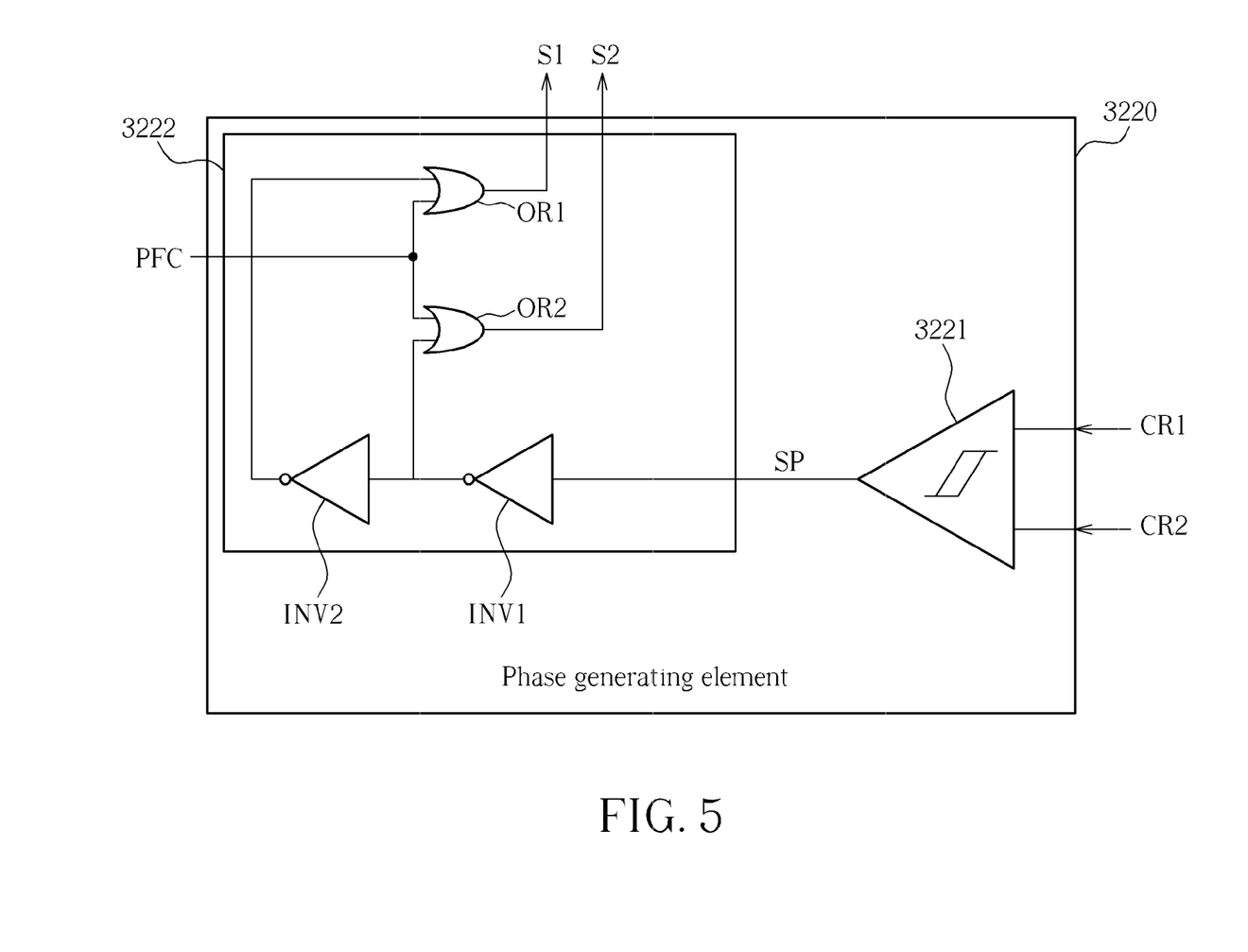
FIG. 5 is a diagram illustrating an exemplary circuit structure of the phase generating element according to an embodiment of the present invention.

Please refer to FIG. 4, which is a diagram illustrating an exemplary circuit structure of the current generating element 3210 according to an embodiment of the present invention. The exemplary current generating element 3210 includes a first comparator 3211 and a second comparator 3212. The first comparator 3211 receives a first reference voltage VR1, and generates the first comparison result CR1 according to the first reference voltage VR1 and the voltage VS1 that is proportional to the first current I1; and the second comparator 3212 receives a second reference voltage VR2, and generates the second comparison result CR2 according to the second reference voltage VR2 and the voltage VS2 that is proportional to the second current I2. Please refer to FIG. 5 for further understanding of the operation and architecture of the phase generating element 3220. FIG. 5 is a diagram illustrating an exemplary circuit structure of the phase generating element 3220 according to an embodiment of the present invention. The phase generating element 3220 includes a hysteresis circuit 3221 and a determining circuit 3222. The hysteresis circuit 3221 generates a phase signal SP according to a variation status of the phase comparison result (i.e., the first comparison result CR1 and the second comparison result CR2). The use of the hysteresis circuit 3221 may ensure that only when the phase variation of the alternating current signal of the AC power SA exceeds a predetermined threshold, the corresponding phase signal SP is outputted. Therefore, even if the first comparison result CR1 and the second comparison result CR2 are varied due to the external factor (e.g., noise interference), the hysteresis circuit 3221 may still output the phase signal SP correctly. The determining circuit 3222 generates the first control signal S1 and the second control signal S2 according to the phase signal SP and the power factor correction signal PFC. In this embodiment, the determining circuit 3222 includes inverters INV1 and INV2, and OR logic gates OR1 and OR2. As can be seen in FIG. 5, the inverters INV1 and INV2 invert and amplify the phase signal SP, and the resultant amplified signals are then inputted to the OR logic gates OR1 and OR2, respectively. The OR logic gates OR1 and OR2 receive the power factor correction signal PFC simultaneously to generate the first control signal S1 and the second control signal S2. As a person skilled in the art can readily understand that when the power factor correction signal PFC indicates an "ON" status, the first switch element SW1 and the second switch element SW2 are both switched on, and when the power factor correction signal PFC indicates an "OFF" status, one of the first switch element SW1 and the second switch element SW2 is switched on according to phase signal SP outputted by the hysteresis circuit 3221, and the other of the first switch element SW1 and the second switch element SW2 is switched off. In this way, the number of switching times of the switch elements SW1 and SW2 is greatly reduced. When the power converter 3000 is lightly-loaded or fully-loaded, there is only the voltage drop between the source-drain of one switch element, either SW1 or SW2, in the signal conduction path, and the voltage drop of the body diode D3/D4 in the switch element SW1/SW2 does not exist. Thus, the power conversion efficiency may be further enhanced by the switch control circuit 3200.

Figure 6:
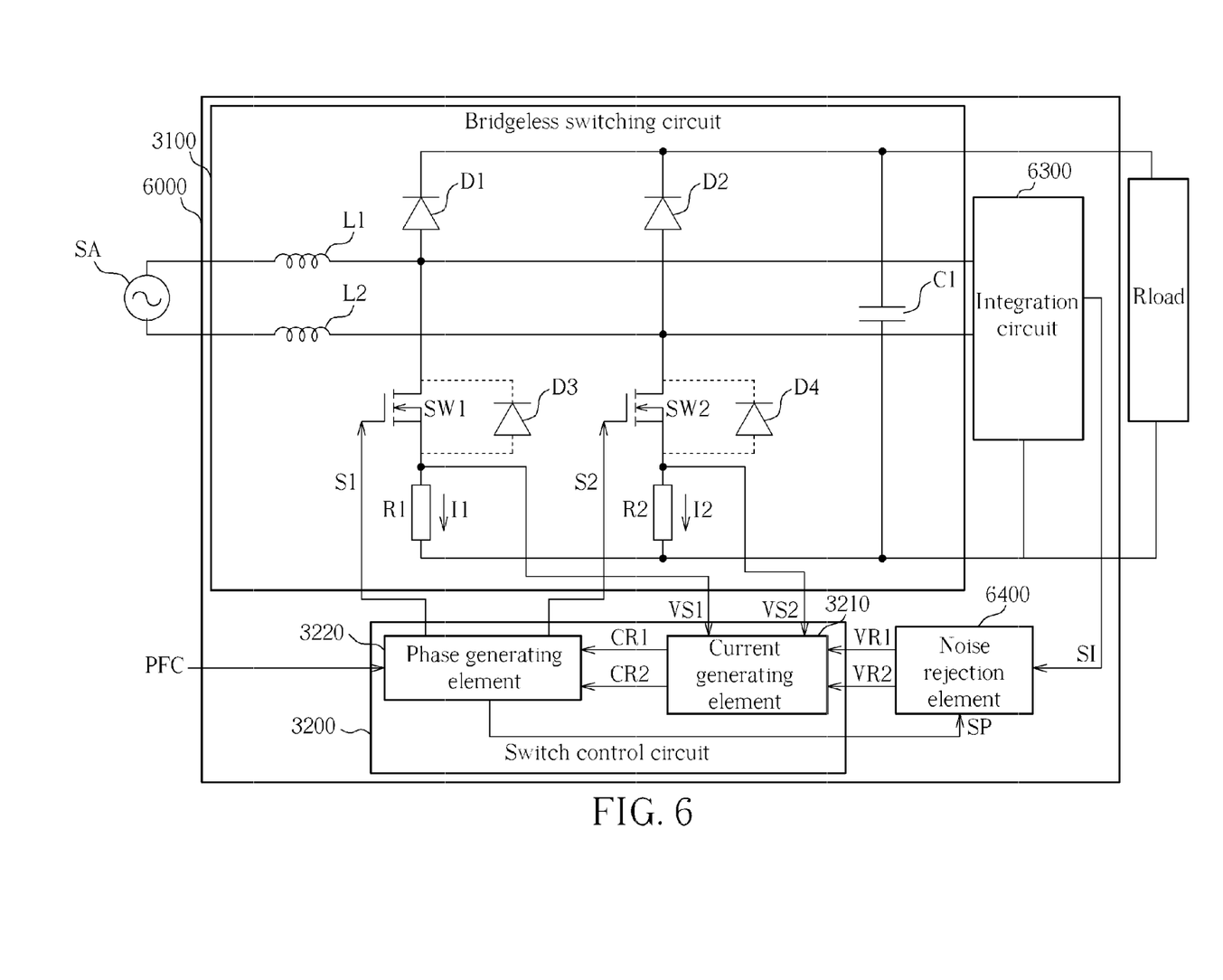
FIG. 6 is a diagram illustrating a power converter employed to convert an alternating current of an AC power to generate a direct current to a load according to an embodiment of the present invention.
Figure 7:
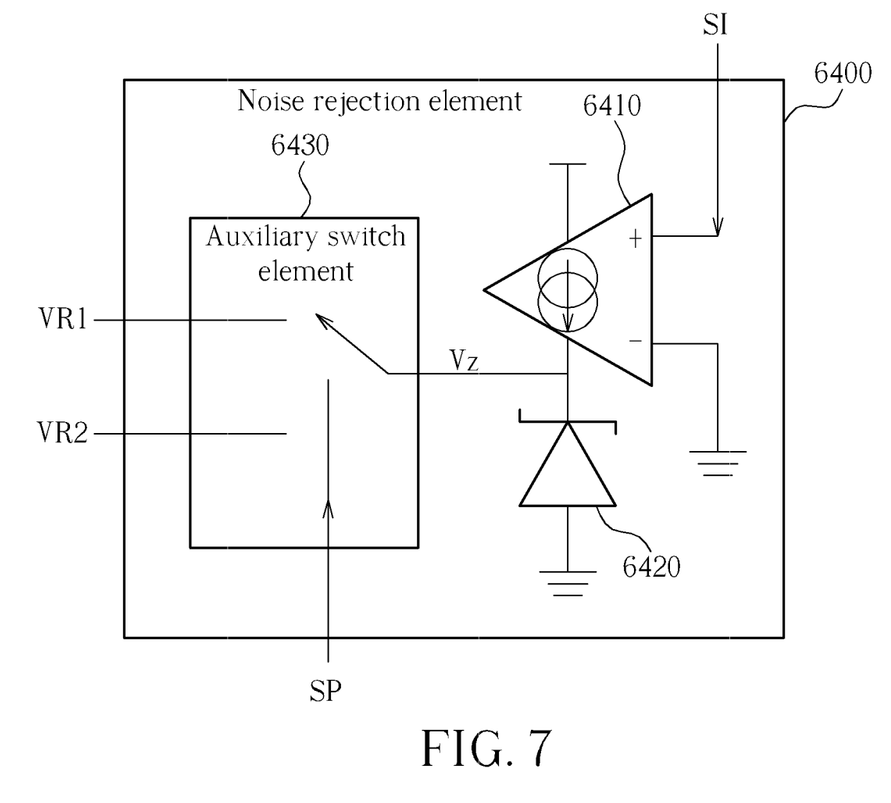
FIG. 7 is a diagram illustrating an exemplary circuit structure of a noise rejection element according to an embodiment of the present invention.

Please refer to FIG. 6, which is a diagram illustrating a power converter 6000 employed to convert an alternating current of an AC power SA to generate a direct current to a load Rload according to an embodiment of the present invention. The exemplary power converter 6000 includes the same bridgeless switching circuit 3100 and the switch control circuit 3200 as shown in FIG. 3, and further includes an integration circuit 6300 and a noise rejection element 6400. The integration circuit 6300 generates an integration signal SI according to the alternating current signal of the AC power SA. In this embodiment, the integration circuit 6300 may be implemented by a simple combination of capacitors and resistors as long as the finally outputted signal SI can reflect the absolute value of the alternating current signal. The noise rejection element 6400 generates a voltage signal Vz according to the integration signal SI, and selectively outputs the voltage signal Vz as the first reference voltage VR1 or the second reference voltage VR2 according to the phase signal SP generated by the phase generating element 3220. Please refer to FIG. 7 for further understanding of the operation and architecture of the noise rejection element 6400. FIG. 7 is a diagram illustrating an exemplary circuit structure of the noise rejection element 6400 according to an embodiment of the present invention. The noise rejection element 6400 includes a voltage-current converter 6410, a Zener diode 6420, and an auxiliary switch element 6430. The voltage-current converter 6410 has an input port for receiving the integration signal SI and an output port for outputting a reference current, and is mainly used to convert the voltage of the integration signal SI to the reference current for further processing. The Zener diode 6420 has a first port coupled to the output port of the voltage-current converter 6410 and a second port coupled to a reference voltage (in this embodiment, the reference voltage is a ground voltage), and is used for receiving the reference current and converting the reference current to the voltage signal Vz. The auxiliary switch element 6430 has an input port for receiving the voltage signal Vz, a control port for receiving the phase signal SP, and a first output port and a second output port coupled to the current generating element 3210, and is used for selectively connecting the input port to the first output port or the second output port according to the phase signal SP. Due to the inherent voltage-current characteristics of the Zener diode 6420, when the reference current is too large, implying that the alternating current signal inputted is too large, the voltage signal Vz outputted is still confined within a predefined range. Therefore, when the alternating current signal is too large, the noise rejection element 6400 still provides the first reference voltage VR1 and the second reference voltage VR2 each having a voltage value within the predefined range by means of the inherent characteristics of the Zener diode 6420. Moreover, when the alternating current signal is smaller, the noise rejection element 6400 outputs the first reference voltage VR1 and the second reference voltage VR2 each having a proper voltage value for the current generating element 3210 to thereby maintain the sensitivity of the phase detection.

Figure 8:
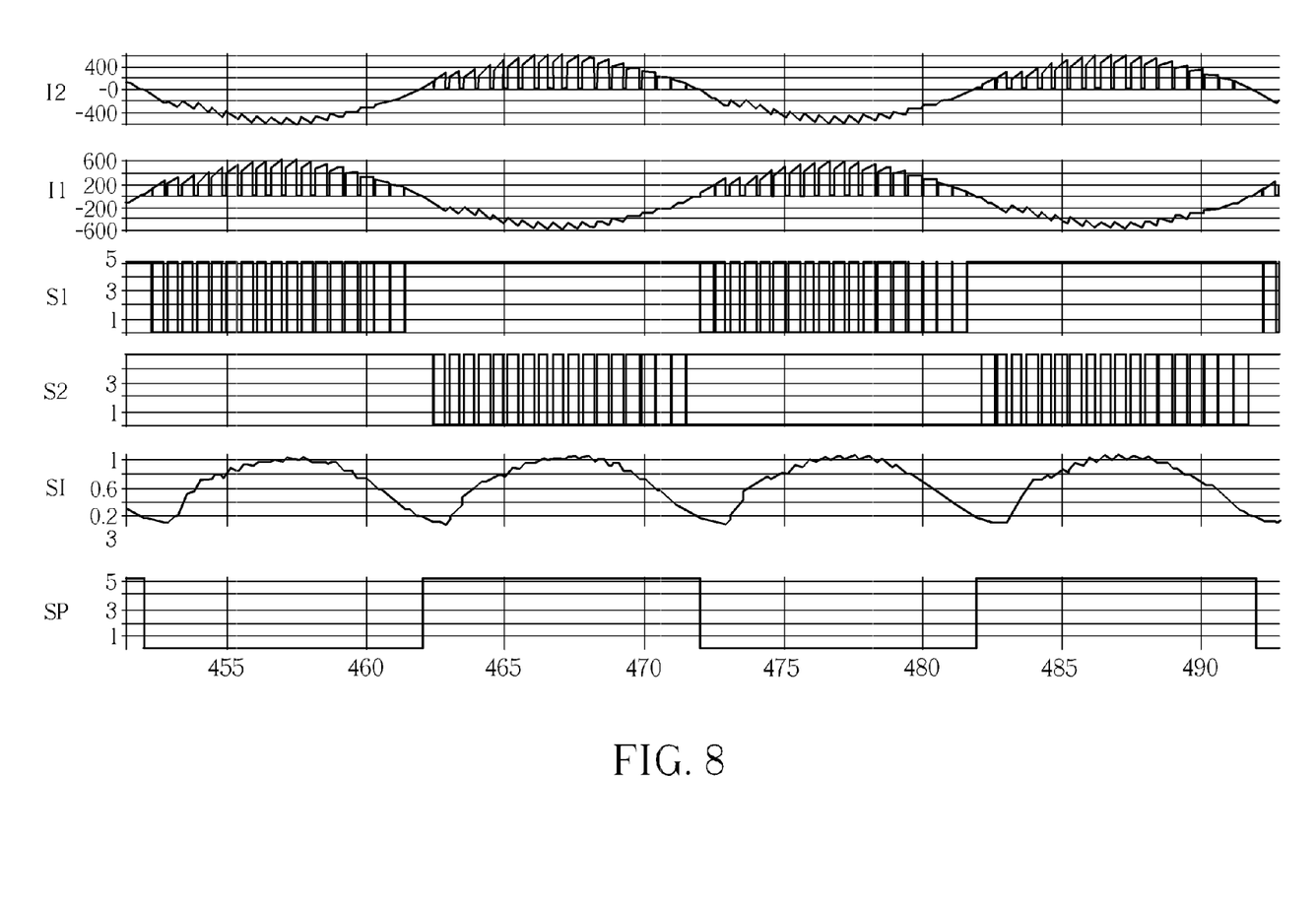
FIG. 8 is a partial timing diagram illustrating signals of the power converter operating in a normal mode according to an embodiment of the present invention.

Please refer to FIG. 8 in conjunction with FIG. 6. FIG. 8 is a partial timing diagram of signals of the power converter 6000 operating under a normal mode according to an embodiment of the present invention. As shown in FIG. 8, when receiving the alternating current signal, the switch elements SW1 and SW2 are alternately switched on/off to continually generate the currents I1 and I2 to charge the load Rload; besides, the phase generating element 3220 generates the phase SP according to the status of the currents I1 and I2, and the integration circuit 6300 generates the rectified integration signal SI to the switch control circuit 3200 according to the intensity of the alternating current signal. As the integration signal SI is capable of reflecting the absolute value of the alternating current signal, the noise rejection element 6400 may provide the first reference voltage VR1 and the second reference voltage VR2, each having a proper voltage value, to the current generating element 3210 for phase detection. When the phase signal SP has a high voltage level, the first control signal S1 may also stay at the high voltage level to maintain the first switch element SW1 in the conductive status, and the second control signal S2 may switch on or switch off the second switch element SW2 according to the power factor correction signal PFC to thereby enhance the power conversion efficiency. However, when the phase signal SP has a low voltage level, the second control signal S2 may stay at the high voltage level to maintain the second switch element SW2 in the conductive status, and the first control signal S1 may switch on or switch off the first switch element SW1 according to the power factor correction signal PFC. Compared to the prior art, the first control signal S1 and the second control signal S2 of the present invention do not make both of the first switch element SW1 and the second switch element SW2 switched off simultaneously. In this way, unnecessary voltage drops in the conduction path may be avoided, and the number of switching times of the switch elements may be lowered to reduce the power loss, which further enhances the power conversion efficiency.

Figure 9:
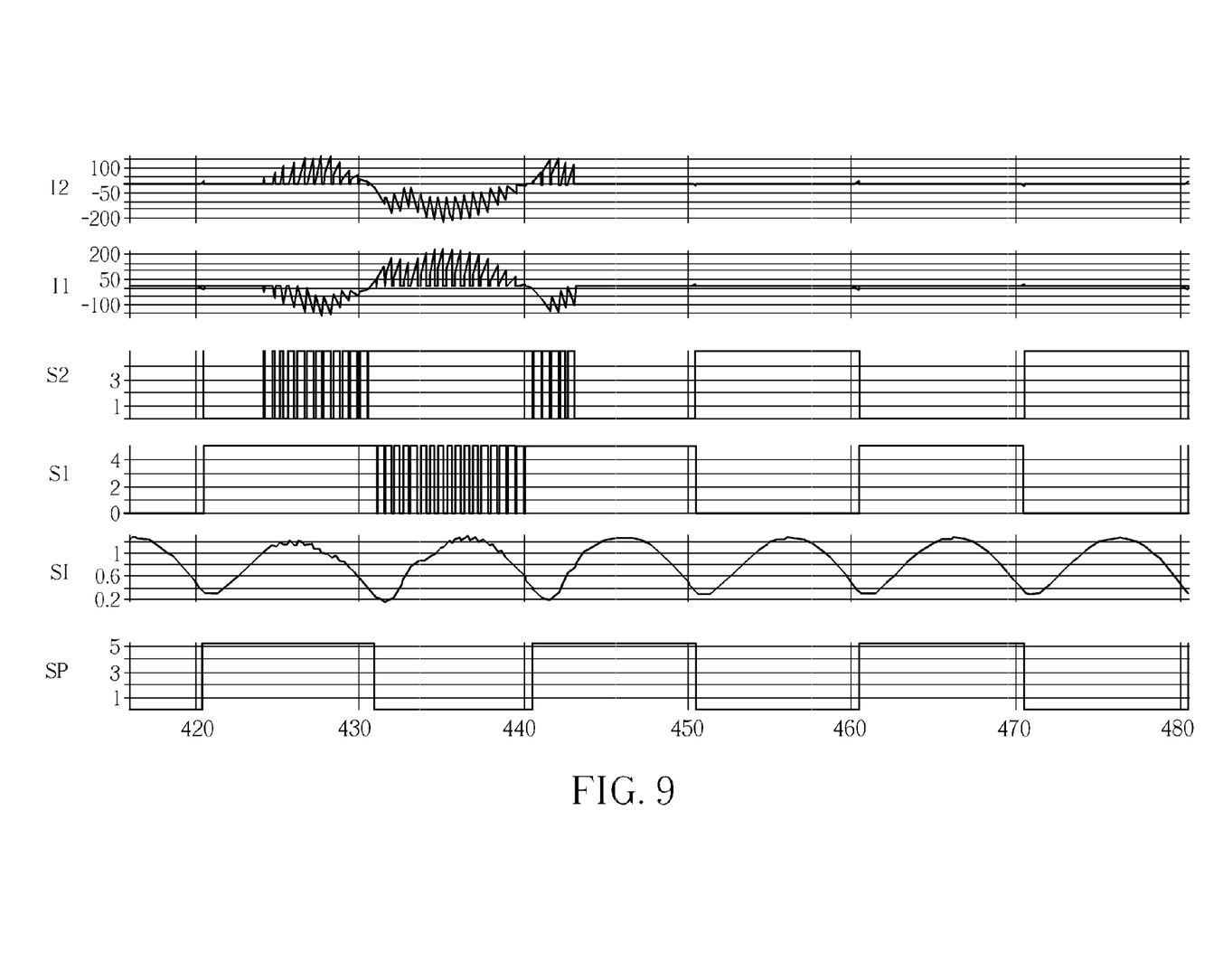
FIG. 9 is a partial timing diagram illustrating signals of the power converter operating in a hick-up mode according to an embodiment of the present invention.

Please refer to FIG. 9 in conjunction with FIG. 8. FIG. 9 is a partial timing diagram illustrating signals of the power converter 6000 operating in a hick-up mode according to an embodiment of the present invention. When the power converter 6000 enters the hick-up mode, the received alternating current signal is shut off intermittently. However, as shown in FIG. 9, during the shut-off period, there is still a little current flowing through the first switch element SW1 and the second switch element SW2, and the noise rejection element 6400 also outputs the smaller voltage signal Vz as the first reference voltage VR1 or the second reference voltage VR2 for allowing the following current generating element 3210 and phase generating element 3220 to correctly generate the first comparison result CR1, the second comparison result CR2, and the phase signal SP kept at the correct phase. However, the conventional control method for the bridgeless switching circuit is to switch on or switch off the first switch element SW1 and the second switch element SW2 simultaneously. As a result, it is unable to define the phase relation clearly under a situation where little current is conducted. In contrast to the conventional design, the power converter 6000 is capable of maintaining the correct phase relation under all situations to make the following circuits operate more easily.

To sum up, the present invention provides a switch control circuit for the bridgeless switching circuit and the power converter, and related method thereof. By properly controlling the conducting statuses of the first switch element and the second switch element within the bridgeless switching circuit, the power conversion efficiency can be enhanced effectively.

Those skilled in the art will readily observe that numerous modifications and alterations of the device and method may be made while retaining the teachings of the invention.

What is claimed is:

1. A switch control circuit for controlling conducting statuses of a first switch element and a second switch element within a bridgeless switching circuit, the bridgeless switching circuit generating an output signal according to an alternating current signal, the switch control circuit comprising:
    a current generating element, coupled to the bridgeless switching circuit, for sensing a first current flowing through the first switch element and a second current flowing through the second switch element, respectively, and generating a phase comparison result according to the first current and the second current; and
    a phase generating element, coupled to the current generating element, for generating a first control signal and a second control signal according to a power factor correction signal and the phase comparison result to control the conducting statuses of the first switch element and the second switch element, respectively.

2. The switch control circuit of claim 1, wherein the first control signal and the second control signal generated by the phase generating element do not make both of the first switch element and the second switch element switched off simultaneously.

3. The switch control circuit of claim 1, wherein the phase generating element comprises:
    a hysteresis circuit, for generating a phase signal according to a variation status of the phase comparison result; and
    a determining circuit, coupled to the hysteresis circuit, for generating the first control signal and the second control signal according to the phase signal and the power factor correction signal.

4. The switch control circuit of claim 3, wherein the phase comparison result comprises a first comparison result and a second comparison result; and
the current generating element comprises:
    a first comparator, for receiving a first reference voltage, and generating the first comparison result according the first current and the first reference voltage; and
    a second comparator, for receiving a second reference voltage, and generating the second comparison result according the second current and the second reference voltage.

5. The switch control circuit of claim 4, further comprising:
    an integration circuit, for generating an integration signal according to the alternating current signal;
    a noise rejection element, coupled to the integration circuit, for generating a voltage signal according to the integration signal, and selectively outputting the voltage signal as the first reference voltage or the second reference voltage according to the phase signal generated by the phase generating element.

6. The switch control circuit of claim 5, wherein the noise rejection element comprises:
    a voltage-current converter, having an input port for receiving the integration signal and an output port for outputting a reference current;
    a Zener diode, having a first port coupled to the output port of the voltage-current converter and a second port coupled to a reference voltage, wherein the Zener diode is for receiving the reference current and converting the reference current to the voltage signal; and
    an auxiliary switch element, having an input port for receiving the voltage signal, a control port for receiving the phase signal, and a first output port and a second output port coupled to the current generating element, wherein the auxiliary switch element is for selectively connecting the input port of the auxiliary switch element to the first output port or the second output port according to the phase signal.

7. A switch control method for controlling conducting statuses of a first switch element and a second switch element within a bridgeless switching circuit, the bridgeless switching circuit generating an output signal according to an alternating current signal, the switch control method comprising:
    sensing a first current flowing through the first switch element and a second current flowing through the second switch element in the bridgeless switching circuit, respectively, and generating a phase comparison result according to the first current and the second current; and
    generating a first control signal and a second control signal according to a power factor correction signal and the phase comparison result to control the conducting statuses of the first switch element and the second switch element, respectively.

8. The switch control method of claim 7, wherein the first control signal and the second control signal do not make both of the first switch element and the second switch element switched off simultaneously.

9. The switch control method of claim 7, wherein the step of generating the first control signal and the second control signal according to the power factor correction signal and the phase comparison result comprises:
    generating a phase signal according to a variation status of the phase comparison result; and
    generating the first control signal and the second control signal according to the phase signal and the power factor correction signal.

10. The switch control method of claim 9, wherein the phase comparison result comprises a first comparison result and a second comparison result, and the step of generating the phase comparison result according to the first current and the second current comprises:

receiving a first reference voltage, and generating the first comparison result according to the first current and the first reference voltage; and receiving a second reference voltage, and generating the second comparison result according to the second current and the second reference voltage.

11. The switch control method of claim 10, further comprising:

generating an integration signal according to the alternating current signal; and generating a voltage signal according to the integration signal, and selectively outputting the voltage signal as the first reference voltage or the second reference voltage according to the phase signal.

12. A power converter, comprising:

a bridgeless switching circuit, for generating an output signal according to an alternating current signal, the bridgeless switching circuit comprising a first switch element and a second switch element; and a switch control circuit, coupled to the bridgeless switching circuit, for generating a first control signal and a second control signal according to a first current flowing through the first switch element, a second current flowing through the second switch element and a power factor correction signal, and accordingly controlling conducting statuses of the first switch element and the second switch element, wherein the first control signal and the second control signal do not make both of the first switch element and the second switch element switched off simultaneously.

13. The power converter of claim 12, wherein the switch control circuit comprises:

a current generating element, coupled to the bridgeless switching circuit, for sensing the first current flowing through the first switch element and the second current flowing through the second switch element, respectively, and generating a phase comparison result according to the first and the second currents; and a phase generating element, coupled to the current generating element, for generating the first control signal and the second control signal according to the power factor correction signal and the phase comparison result to control the conducting statuses of the first switch element and the second switch element, respectively.

14. The power converter of claim 13, wherein the phase generating element comprises:

a hysteresis circuit, for generating a phase signal according to a variation status of the phase comparison result; and a determining circuit, coupled to the hysteresis circuit, for generating the first control signal and the second control signal according to the phase signal and the power factor correction signal.

15. The power converter of claim 14, wherein the phase comparison result comprises a first comparison result and a second comparison result; and the current generating element comprises:

a first comparator, for receiving a first reference voltage, and generating the first comparison result according the first current and the first reference voltage; and a second comparator, for receiving a second reference voltage, and generating the second comparison result according the second current and the second reference voltage.

16. The power converter of claim 15, further comprising:

an integration circuit, for generating an integration signal according to the alternating current signal; and a noise rejection element, coupled to the integration circuit, for generating a voltage signal according to the integration signal, and selectively outputting the voltage signal as the first reference voltage or the second reference voltage according to the phase signal generated by the phase generating element.

17. The power converter of claim 16, wherein the noise rejection element comprises:

a voltage-current converter, having an input port for receiving the integration signal and an output port for outputting a reference current;

a Zener diode, having a first port coupled to the output port of the voltage-current converter and a second port coupled to a reference voltage, for receiving the reference current and converting the reference current to the voltage signal; and an auxiliary switch element, having an input port for receiving the voltage signal, a control port for receiving the phase signal, and a first output port and a second output port coupled to the current generating element, wherein the auxiliary switch element is for selectively connecting the input port of the auxiliary switch element to the first output port or the second output port according to the phase signal.

18. A power conversion method, comprising:

utilizing a bridgeless switching circuit to generate an output signal according to an alternating current signal, wherein the bridgeless switching circuit comprises a first switch element and a second switch element; and generating a first control signal and a second control signal according to a first current flowing through the first switch element, a second current flowing through the second switch element and a power factor correction signal, and accordingly controlling conducting statuses of the first switch element and the second switch element, respectively, wherein the first control signal and the second control signal do not make both of the first switch element and the second switch element switched off simultaneously.

19. The power conversion method of claim 18, wherein the step of generating the first control signal and the second control signal according to the first current flowing through the first switch element, the second current flowing through the second switch element and the power factor correction signal, and accordingly controlling the conducting statuses of the first switch element and the second switch element comprises:

sensing the first current flowing through the first switch element and the second current flowing through the second switch element in the bridgeless switching circuit, respectively, and generating a phase comparison result according to the first and the second currents; and generating the first control signal and the second control signal according to the power factor correction signal and the phase comparison result to control the conducting statuses of the first switch element and the second switch element, respectively.

20. The power conversion method of claim 19, wherein the step of generating the first control signal and the second control signal according to the power factor correction signal and the phase comparison result comprises:

generating a phase signal according to a variation status of the phase comparison result; and generating the first control signal and the second control signal according to the phase signal and the power factor correction signal.

21. The power conversion method of claim 20, wherein the phase comparison result comprises a first comparison result and a second comparison result, and the step of generating the phase comparison result according to the first and the second currents comprises:

receiving a first reference voltage, and generating a first comparison result according the first current and the first reference voltage; and receiving a second reference voltage, and generating a second comparison result according the second current and the second reference voltage.

22. The power conversion method of claim 21, further comprising:

generating an integration signal according to the alternating current signal; and generating a voltage signal according to the integration signal, and selectively outputting the voltage signal as the first reference voltage or the second reference voltage according to the phase signal.

* * * * *